United States Patent [19]
Yamasaki et al.

[11] Patent Number: 5,954,267
[45] Date of Patent: Sep. 21, 1999

[54] METHOD FOR SPRAYING STARTING MATERIAL PARTICLES IN CONTINUOUS HYDROTHERMAL REACTION AND APPARATUS THEREFOR

[75] Inventors: Nakamichi Yamasaki, Takaoka-gun; Tsuneaki Mochida, Yokohama; Akihiro Maeda, Kawasaki; Takeshi Fukuda, Kurobe; Tsuyoshi Morimura, Namerikawa, all of Japan

[73] Assignees: Nakamichi Yamasaki, Takaoka-gun, Kochi; YKK Corporation, Tokyo, both of Japan

[21] Appl. No.: 08/974,854

[22] Filed: Nov. 20, 1997

[30] Foreign Application Priority Data

Nov. 22, 1996 [JP] Japan ..................... 8-312097

[51] Int. Cl.⁶ ............... B05B 1/24; B05B 15/00
[52] U.S. Cl. .......... 239/13; 239/128; 239/132; 239/132.1; 239/132.3; 239/424.5; 422/198
[58] Field of Search ............ 239/13, 128, 132, 239/132.1, 132.3, 135, 424.5; 422/198, 200, 201, 207

[56] References Cited

U.S. PATENT DOCUMENTS

| | | | |
|---|---|---|---|
| 3,601,378 | 8/1971 | Hurst | 263/36 |
| 4,946,475 | 8/1990 | Lipp et al. | 239/132.3 X |
| 5,346,133 | 9/1994 | Bogner et al. | 239/132.3 X |
| 5,503,548 | 4/1996 | Franke et al. | 239/132.3 X |
| 5,543,126 | 8/1996 | Ota et al. | 423/263 |
| 5,558,783 | 9/1996 | McGuinness | 422/198 X |
| 5,674,405 | 10/1997 | Bourhis et al. | 210/761 |
| 5,843,386 | 12/1998 | Makino et al. | 422/203 |

FOREIGN PATENT DOCUMENTS

| | | |
|---|---|---|
| 0 783 921 | 7/1997 | European Pat. Off. |
| 53-57112 | 5/1978 | Japan. |
| 2-5136 | 1/1990 | Japan. |
| WO 96/00610 | 11/1996 | WIPO. |

*Primary Examiner*—Andres Kashnikow
*Assistant Examiner*—Robin O. Evans
*Attorney, Agent, or Firm*—Finnegan, Henderson, Farabow, Garrett & Dunner, L.L.P.

[57] ABSTRACT

A method for spraying starting material particles in a continuous hydrothermal reaction, comprising spraying an aqueous fluid pressurized and heated in excess of the saturated vapor temperature and a starting material slurry pressurized at ordinary temperature. A starting material slurry feed orifice is provided in a central portion of an aqueous fluid spray orifice to spray and mix the aqueous fluid and the staring material slurry. In order to avoid entry of heat into the starting material fluid from the aqueous fluid, a heat-insulating layer is provided between feed paths for the respective two fluids. According to the above method, the starting material slurry is sprayed particularly under sub-critical to supercritical conditions beyond the saturated vapor temperature to form fine particles without agglomeration thereof, whereby a hydrothermal reaction can be continuously and efficiently effected.

7 Claims, 1 Drawing Sheet

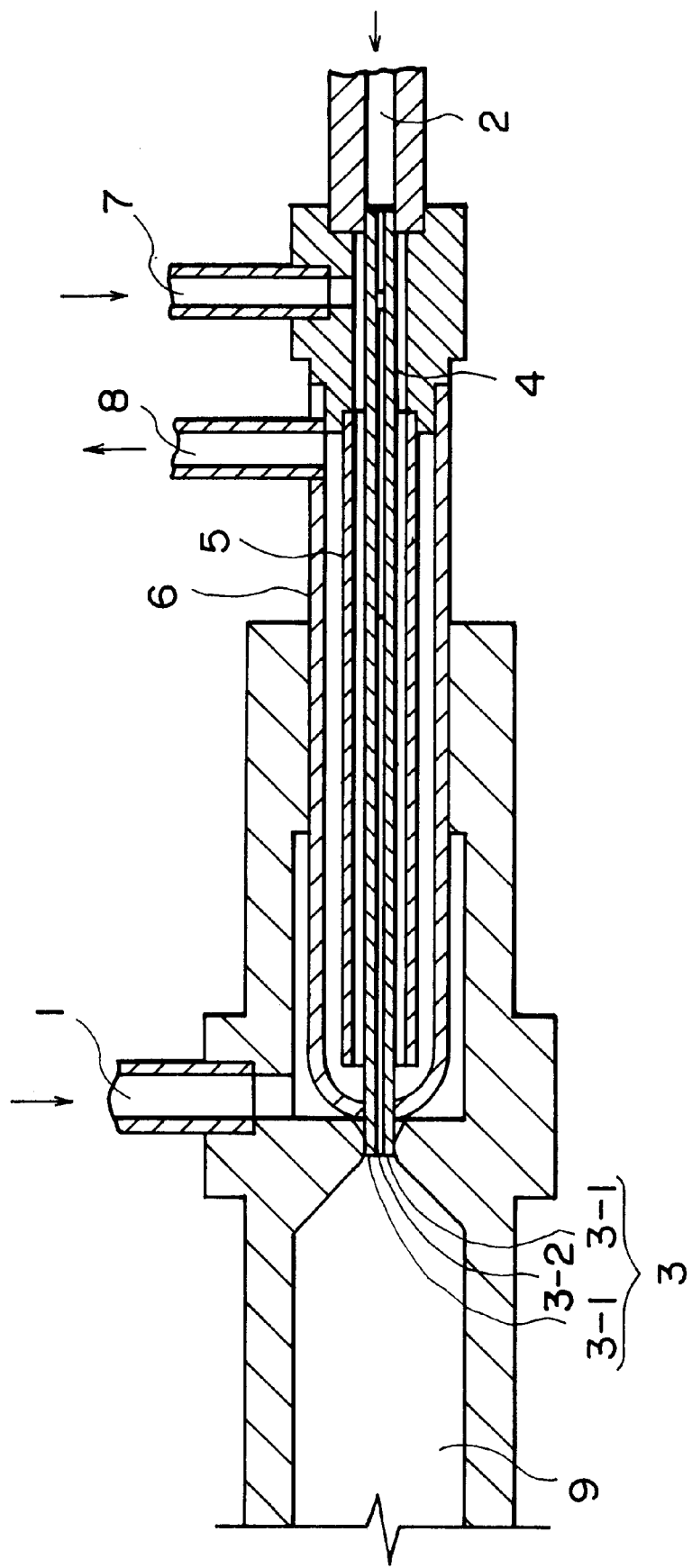

METHOD FOR SPRAYING STARTING MATERIAL PARTICLES IN CONTINUOUS HYDROTHERMAL REACTION AND APPARATUS THEREFOR

BACKGROUND OF THE INVENTION

1. Field of the Invention

The present invention provides a spraying method and apparatus for spraying a starting material slurry through a nozzle in a continuous hydrothermal reaction, particularly under subcritical to supercritical conditions beyond the saturated vapor temperature to form fine particles without agglomeration thereof for efficiently effecting the hydrothermal reaction.

2. Description of the Prior Art

Since the rates of reactions of many oxides such as silica and alumina with high-pressure steam, particularly water having a temperature of at least the critical temperature, become fast in the presence of high-temperature water, particularly high-temperature and high-pressure water, hydrothermal synthesis reactions are widely carried out by making much of this phenomenon. A technique of hydrothermal synthesis of particles under pressurized conditions beyond the critical pressure (Tp=218.3 atm) in a temperature range beyond the saturated vapor temperature, particularly beyond the critical temperature (e.g., Tc=374° C. for water), is carried out according to a batch method. In a large-scale batch method, however, a long heat-up time from the point of time when a starting material is set is taken together with a long temperature dropping time besides the period of time during which the desired temperature and pressure are maintained. Furthermore, there is a limit to efficient synthesis with one equipment because of batchwise production.

On the other hand, a method wherein a slurry is continuously fed through assembled piping for treatment therof is disclosed, for example, in Japanese Patent Laid-Open No. 57,112/1978, but is not aimed at a hydrothermal reaction of particles to be different in purpose from the present invention. Besides, Japanese Patent Publication No. 5,136/1990 discloses a technology according to which a reaction is effected under the saturated vapor pressure. There are no continuous hydrothermal reaction technologies according to which a hydrothermal reaction of particles is effected with such assembled pipings as to maintain a pressurized state particularly at a temperature exceeding the critical temperature, followed by temperature drop and pressure reduction, and subsequent discharge of the reacted particles.

When a hydrothermal reaction is to be consistently effected in a continuous piping, there arise various difficulties such as a problem with feeding of a starting material slurry, a problem with retention of a piping in a state of being heated at a high temperature, and a problem with withdrawal of synthesized particles. The present invention is to solve a problem involved particularly in feeding a starting material slurry into a reaction chamber. More specifically, even if a starting material slurry is flowed in a piping in a temperature range beyond the saturated vapor temperature, particularly beyond the critical temperature, the solid in the slurry may possibly be separated to be stuffed in the piping because water is in the form of steam. In view of this, according to the present invention, the solid in the slurry is finely sprayed and then fed into a reaction chamber in order to efficiently effect a reaction thereof without the sliding being stuffed in a piping.

SUMMARY OF THE INVENTION

The present invention provides a method for spraying starting material particles in a continuous hydrothermal reaction, comprising spraying an aqueous fluid pressurized and heated in excess of the saturated vapor temperature and a starting material slurry pressurized at ordinary temperature.

More specifically, the starting material slurry is separated from the aqueous fluid. That is, the aqueous fluid is pressurized and heated in excess of the saturated vapor temperature while the starting material slurry is pressurized still at ordinary temperature. The aqueous fluid is sprayed from a spray while spraying the starting material slurry from a spray, whereby the starting material can be conveyed without separation of steam from the staring material while enabling the two systems having thermal gradients to be sprayed and homogeneously mixed with each other even under such conditions in the temperature range as to exceed the saturated vapor temperature, particularly to exceed the critical temperature.

A staring material slurry feed orifice is provided in a central portion of an aqueous fluid spray orifice to spray and mix the aqueous fluid and the staring material slurry. Further, in order to avoid entry of heat into the starting material fluid from the aqueous fluid, a heat-insulating layer is provided between feed paths for the respective two fluids. It is especially desirable to adopt a forced cooling system in which a cooling medium is fed through the inside of the heat-insulating layer.

The present invention also provides an apparatus for spraying starting material particles in a continuous hydrothermal reaction, wherein a feed orifice for a starting material slurry pressurized at ordinary temperature is opened in a central portion of a spray orifice for an aqueous fluid pressurized and heated in excess of the saturated vapor temperature, provided that a feed piping for the starting material slurry is covered with a heat-insulating layer in order to avoid entry of heat into the slurry from the surrounding aqueous fluid heated in excess of the saturated vapor temperature.

The heat-insulating layer is provided in order to get rid of a fear of bumping of the starting material slurry before spraying thereof under the influence of heat in the possession of the aqueous fluid pressurized and heated in excess of the saturated vapor temperature. The heat-insulating layer is constituted either of a heat-insulating material (e.g., a ceramic) packed inside a pipe surrounding a starting material slurry feed pipe, or of double pipes surrounding the starting material slurry feed pipe in which case a cooling medium is fed from a side of the double pipes on which side the starting material slurry is fed while the cooling medium is discharged from a side of double pipes on which the aqueous medium is fed, whereby forced cooling can be effected. In the latter case, the cooling medium is first fed around the starting material feed piping to maintain a sufficient cooling effect, and then receives heat of the aqueous fluid when sent on the side of the aqueous liquid to sequentially dissipate heat out of the system while being circulated to hereby exhibit a heat-insulating effect. Usable examples of examples of the cooling medium include water, air and oils.

BRIEF DESCRIPTION OF THE DRAWING

The single FIGURE is a cross-sectional view of an example of the present invention.

DETAILED DESCRIPTION OF THE PREFERRED EMBODIMENTS

The present invention is applicable to hydrothermal reactions of metal oxides such as alumina ($Al_2O_3$), zirconia ($ZrO_2$), chromia ($Cr_2O_3$), hafnia ($HfO_2$), and titania ($TiO_2$). The present invention will now be specifically illustrated based on the accompanying drawing.

EXAMPLE

The drawing is an example of an apparatus used for carrying out the present invention. In the drawing, numeral 1 refers to an inlet for an aqueous fluid having a temperature exceeding the saturated vapor temperature, 2 to an inlet for a starting material slurry pressurized at ordinary temperature, and 3 to an ejection orifice for a mixture thereof. The ejection orifice 3 is constituted of a spray orifice 3-1 on the outer side thereof and a feed orifice 3-2 in a central portion thereof. Numeral 4 refers to a starting material feed pipe (feed piping), and 5 and 6 to double pipes surrounding the staring material slurry feed pipe 4, the inner pipe 5 of which is opened at the left end thereof to communicate with the outer pipe 6. Numeral 7 refers to a cooling medium inlet, and 8 to a cooling medium outlet. A cooling medium such as water or air is fed from the cooling medium inlet 7, passed along the outer side of the starting material slurry feed pipe 4 in the inner pipe 5 of the double pipes to reach the left end, turned back in the outer pipe 6, and discharged from the cooling medium outlet 8. During this course, the cooling medium inside the inner pipe 5 suppresses the heat-up of the starting material slurry feed pipe 4, and prevents the influence of heat of the aqueous fluid fed from the side of the outer pipe 6. The cooling medium passed through the outer pipe 6 absorbs heat of the aqueous fluid, and gives off the absorbed heat out of the system from the cooling medium outlet 8. The pressurized and heated aqueous fluid and the pressurized starting material slurry are effected from the mixture ejected orifice 3 and mixed with each other to reach the inside of a mixing chamber 9. During this course, particles in the starting material are finely pulverized simultaneously with separation of agglomerated particles.

Alternatively, a heat-insulating material may be packed instead of the double pipes, or a heat-insulating material itself may be fabricated into a hollow tube through which a cooling medium is passed.

According to the present invention, a starting material slurry is sprayed particularly under subcritical to supercritical conditions beyond the saturated vapor temperature to form fine particles without agglomeration thereof, whereby a hydrothermal reaction can be continuously and efficiently effected. Particularly, the starting material slurry, while separated from an aqueous fluid, is set at ordinary temperature just until the starting material slurry is mixed with the aqueous fluid, whereby troubles such as clogging of a piping are obviated to enable a continuous hydrothermal reaction to be efficiently effected.

What is claimed is:

1. A method for spraying starting material particles in a continuous hydrothermal reaction, comprising spraying an aqueous fluid pressurized and heated in excess of the saturated vapor temperature and a starting material slurry pressurized at ordinary temperature.

2. A method for spraying starting material particles in a continuous hydrothermal reaction, comprising spraying and mixing an aqueous fluid pressurized and heated in excess of the saturated vapor temperature and a starting material slurry pressurized at ordinary temperature, provided that a starting material slurry feed orifice is provided in a central portion of an aqueous fluid spray orifice.

3. A method for spraying starting material particles in a continuous hydrothermal reaction, comprising spraying and mixing an aqueous fluid pressurized and heated in excess of the saturated vapor temperature and a starting material slurry pressurized at ordinary temperature while avoiding entry of heat into said starting material slurry from said aqueous fluid, provided that a heat-insulating layer is interposed between an aqueous fluid feed portion and a starting material slurry feed portion.

4. A method for spraying starting material particles in a continuous hydrothermal reaction as set forth in claim 3, wherein said heat-insulating layer is of a forced cooling system wherein a cooling medium is fed thereinto.

5. An apparatus for spraying starting material particles in a continuous hydrothermal reaction, wherein a feed orifice for a starting material slurry pressurized at ordinary temperature is opened in a central portion of a spray orifice for an aqueous fluid pressurized and heated in excess of the saturated vapor temperature, provided that a feed piping for said starting material slurry is covered with a heat-insulating layer in order to avoid entry of heat into said slurry from the surrounding aqueous fluid heated in excess of the saturated vapor temperature.

6. An apparatus for spraying starting material particles in a continuous hydrothermal reaction as set forth in claim 5, wherein said heat-insulating layer is constituted of a heat-insulating material packed in a pipe surrounding a feed pipe for said starting material slurry.

7. An apparatus for spraying starting material particles in a continuous hydrothermal reaction as set forth in claim 5, wherein said heat-insulating layer is constituted of double pipes surrounding said feed piping for said starting material slurry, provided that a cooling medium is fed from a side of said double pipes on which side said starting material slurry is fed, and discharged via a side of said double pipes on which side said aqueous medium is fed.

* * * * *